US006349881B1

(12) United States Patent
Wilkey et al.

(10) Patent No.: US 6,349,881 B1
(45) Date of Patent: Feb. 26, 2002

(54) IDENTIFICATION SYSTEM FOR PERSONAL PROPERTY

(76) Inventors: Richard Bruce Wilkey, 4550 Shackleford Ridge Rd., Signal Mountain, TN (US) 37377-1221; Donald D. Hatcher, 13 Edgwood Cir., Ft. Oglethorpe, GA (US) 30742

( * ) Notice: Subject to any disclaimer, the term of this patent is extended or adjusted under 35 U.S.C. 154(b) by 0 days.

(21) Appl. No.: 09/343,840

(22) Filed: Jun. 30, 1999

(51) Int. Cl.$^7$ .............................................. G06K 19/06
(52) U.S. Cl. ...................................... 235/492; 235/382
(58) Field of Search ......................... 235/492, 487, 235/382

(56) References Cited

U.S. PATENT DOCUMENTS

| | | | |
|---|---|---|---|
| 3,857,640 A | | 12/1974 | Hilbon |
| 4,336,754 A | * | 6/1982 | Loeb ........................ 101/127 |
| 4,435,983 A | | 3/1984 | Shimano |
| 4,489,307 A | | 12/1984 | Nagano |
| 4,814,951 A | | 3/1989 | Larsen |
| 5,083,108 A | | 1/1992 | Guest |
| 5,369,900 A | | 12/1994 | Garrison |
| 5,374,818 A | * | 12/1994 | Bianco et al. ............. 235/492 |
| 5,422,632 A | * | 6/1995 | Bucholtz et al. ....... 340/825.31 |
| 5,434,775 A | * | 7/1995 | Sims et al. ................ 364/403 |
| 5,446,265 A | | 8/1995 | McAllister |
| 5,587,575 A | | 12/1996 | Leitner |
| 5,629,668 A | | 5/1997 | Downs |
| 5,736,929 A | * | 4/1998 | Schrott et al. ............. 340/572 |
| 5,815,069 A | | 9/1998 | Horton |
| 5,836,002 A | | 11/1998 | Morstein |
| 6,126,078 A | * | 10/2000 | Locher et al. ............. 235/492 |

OTHER PUBLICATIONS

John Burnell, "New RFID technology works without wire antenna", *Automatic ID News*, Apr. 1999, p. 18, USA.
Janalan Systems, Inc., "Micro–Tech Identifier System", http://security.providers.net/More/, 1998, USA.
Phil Widdows, "Tag team all set to floor crooks", Item unknown, Date unknown, country unknown.
Terry Snelling, "Chips With Everything", *Motor Cycle News*, Date unknown, UK.
Dallas Semiconductor, "Touch the iButton to the Dot . . .", Brochure, Date unknown, USA.
Dallas Semiconductor Corporation, "50 Ways To Touch Memory" Third Edition, 1994, USA.
Dallas Semiconductor Corporation, "Book of DS19xx iButton Standards", Edition 2.1, Jun. 1995, USA.

\* cited by examiner

*Primary Examiner*—Karl D. Frech
(74) *Attorney, Agent, or Firm*—Chambliss, Bahner & Stophel, P.C.

(57) ABSTRACT

An identification module and a reader are employed in a system for applying identification information to an item of property, and for retrieving such information. The identification module contains a semiconductor memory chip that contains identification information and a component mount that is adapted to hold the memory chip in an interior space of the item of property in a prescribed manner. The reader for retrieving the identification information from the semiconductor memory chip is adapted for connection to a computer or other information retrieval device. The reader includes a probe that is adapted to make electrical contact with the memory chip while the chip is mounted in the interior space of the item of property so that the identification information may be retrieved from the chip.

16 Claims, 5 Drawing Sheets

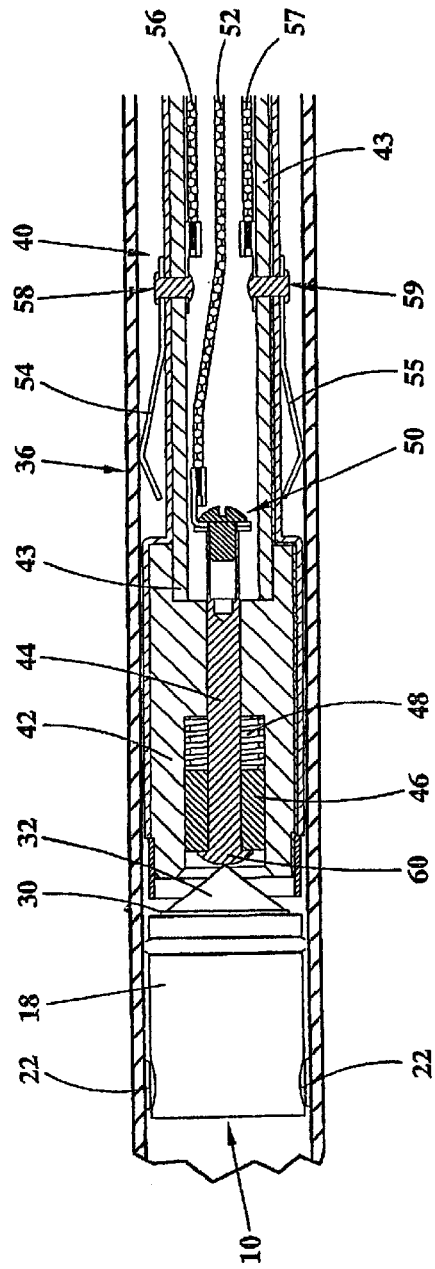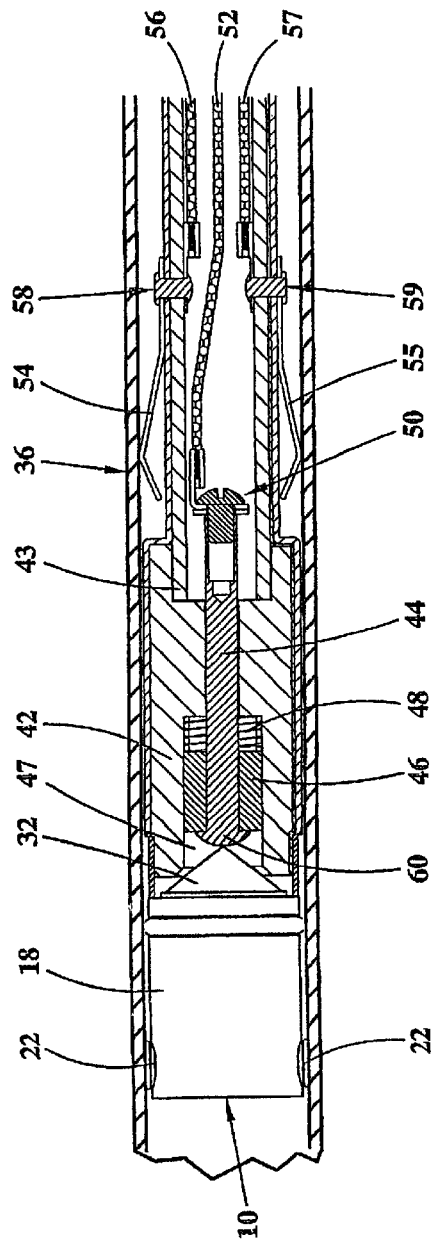
Figure 4
Figure 5

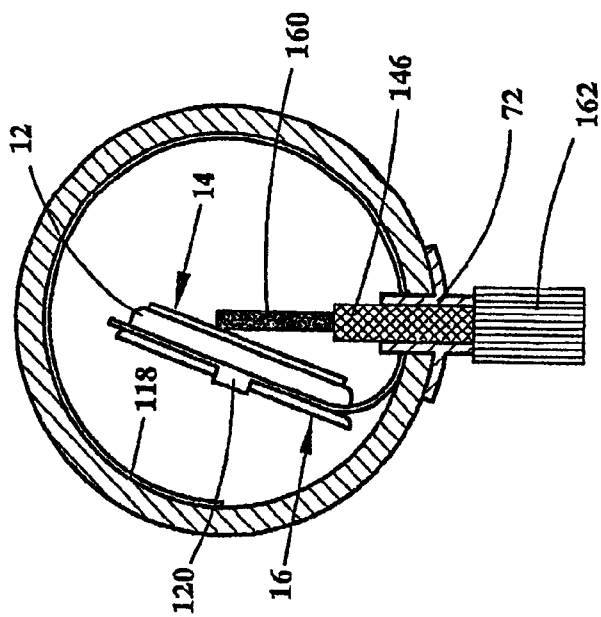
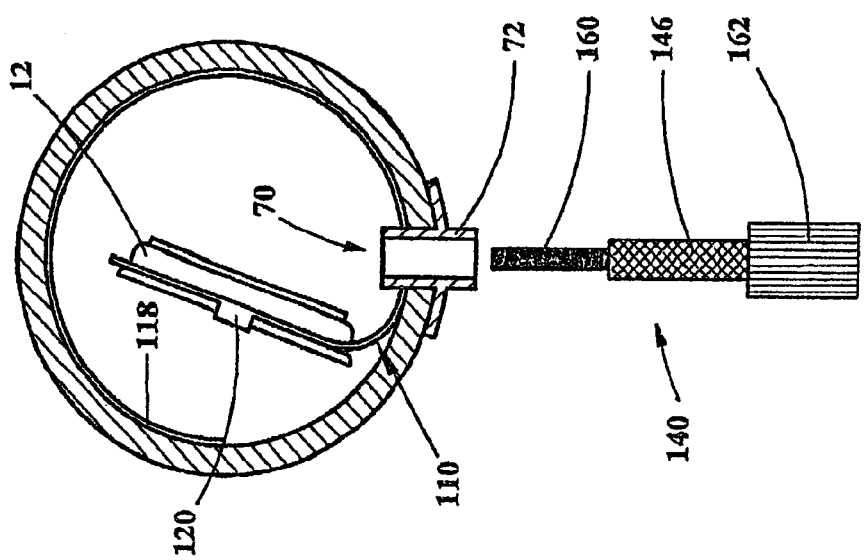

IDENTIFICATION SYSTEM FOR PERSONAL PROPERTY

FIELD OF THE INVENTION

This invention relates generally to the marking of personal property with identifying information and the retrieval of such information from such property. The invention is especially useful in applying identification information to, and retrieving such information from, unicycles, bicycles, motorcycles, tricycles, four-wheelers and ATVs. The invention may be used to identify an item of stolen property that has been recovered by the authorities so as to facilitate the return of the item to its rightful owner.

BACKGROUND OF THE INVENTION

Theft of personal property is a serious problem in the United States. One item of personal property that is easy to steal during normal use is a bicycle. Bicycles are inherently portable, and they can be quickly stolen when left unattended or poorly secured on a sidewalk or other public place. Crime statistics indicate that millions of bicycles are stolen in the United States every year. Motorcycles are probably more difficult to steal, because of their weight and the fact that a key is required for proper operation, but they are also tempting targets for thieves because of their significant value and relative portability.

Many bicycle owners attempt to counter the risk of theft by employing one or more of various locking devices. However, many of the commonly used locking devices can be readily defeated with simple tools, such as lock picks, saws and bolt cutters, in a very short period of time. Even when a strong and effective locking device is used, however, a lamppost or other suitable object to which the bicycle may be locked is not always available. Furthermore, if a locking device is defeated by a determined thief or by the lack of a suitable securing object, the owner will have to rely on other means for assuring that his property, once recovered, can be identified and returned to him.

Since bicycles and motorcycles are so portable that the risk of theft is hard to eliminate, identification methods have been developed for marking these items of property so that if stolen and subsequently recovered, they can be returned to their owners. Manufacturers routinely place serial numbers on bicycles and motorcycles, but these can usually be removed or defaced so as to be illegible with little difficulty. In addition, in order for such serial numbers to be useful to law enforcement personnel, the owners of the vehicles must record the serial numbers and register them with the manufacturers or otherwise make them available to law enforcement personnel in the event of theft. Because reliance on serial numbers has proved ineffective, several other marking systems have also been developed for identifying personal property. Thus, for example, U.S. Pat. No. 5,587,575 of Leitner et al. describes a method and apparatus for identifying vehicles from encoded information that is displayed on a sticker that is applied to the vehicle. The code is in the form of a string of alpha-numeric characters or a bar code that corresponds to information about the vehicle and/or its owner. A code reader is provided that can compare the code (by computer link) read from the sticker to vehicle information stored in a remote computer. A user of the code reader can input the code using a keyboard or a wand-type bar code reader to obtain the stored identification information about the vehicle. However, such a code-bearing sticker can be removed or defaced so as to make its information irretrievable. A more subtle approach is the Micro-Tech Identification System of JanAlan Systems, Inc., which employs a small translucent sticker that is approximately 1.5 mm in diameter. This sticker can be printed with a message of up to 75 alphanumeric characters that may be read using a 30× magnifier. Because the sticker is so small, it is not easily noticed by a thief; however, it may not be noticed by law enforcement personnel either on property that is recovered as stolen. Since it is so small and since it may be placed anywhere on an item of property, only the owner of the property may be able to locate the sticker that he has placed thereon.

U.S. Pat. No. 5,369,900 of Garrison describes an identification badge for a bicycle which comprises a pair of hardened steel casings that are adapted for attachment to the seat tube of a bicycle. The badge has an identifying number engraved thereon and an aluminum sticker with the owner's personal identifying information. This identification badge is not an attractive addition to a bicycle or other item of property, and it is possible that a determined thief could remove it or deface its identifying number. In addition, the aluminum sticker of Garrison could readily be defaced or removed.

U.S. Pat. No. 3,857,640 of Hilbon describes an identification device which contains an identification surface and which is designed to be mounted on an article of property such as an engine or the frame of a bike. The identification surface has an associated rod-like member that is capable of being broken into two parts. Upon breaking, one of the parts of the rod-like member will remain permanently attached to the article, and the other may be retained as a matching piece to identify the article through the "breakprint" formed by breaking the rod-like member. This system requires the owner to retain the broken piece of the rod-like member and to make it available to law enforcement personnel in the event his bike is lost or stolen. In addition, it seems likely that the breakprint formed by breaking the rod-like member of Hilbon could, if placed in a conspicuous place, be defaced by a thief so as to be useless as an identifier.

U.K.I.D. Systems Ltd. of the United Kingdom has developed a microchip tagging system in which passive transponder microchips may be hidden in or on the frame, engine or other major components of a motorcycle. The microchip contains a unique identifier that may be read by a radio frequency (RF) scanner that is activated in the vicinity of the chip. While such a system is likely to be helpful to law enforcement personnel who may recover stolen property, especially because the microtags may be easily hidden so that they cannot be removed by a clever thief, radio frequency scanners are generally quite expensive and require significant power to operate. In addition, RF scanners must operate only within approved frequency ranges. However, since they operate in the electromagnetic spectrum, RF scanners may be adversely affected by electromagnetic interference from either intentional transmitters (such as radio stations) or unintentional transmitters (such as electronic equipment, engines, fluorescent lamps and the like). In addition, information from an RF activated microtag may not be reliably obtained if the effective range of the scanner (taking into account interference of which the operator may not be aware) is exceeded in examining an item of property.

Another radio frequency identification system has been developed by Motorola for access control and product tracking applications. This system uses conductive ink to store data on paper, plastic, glass, metal and other materials, which information is read by activating an RF scanner operating in the 125 KHz frequency range. This system suffers from all of the disadvantages of the U.K.I.D. system described above, especially that of limited range. According to Motorola, a postage stamp sized tag may be read by an RF scanner that is brought within 2 cm of the tag, while an 8.5×11 inch tag may be read from a distance of 28 inches.

It seems clear that theft of personal property including bicycles and motorcycles cannot be eliminated. Therefore, it would be desirable if a system could be developed that would increase the likelihood that stolen property which is recovered may be returned to its rightful owner. Although several systems have been described for marking and identifying property, and for retrieving identifying information therefrom, all have limitations and disadvantages. It would be desirable therefore, if a system could be developed that would facilitate the marking of property with identification information in a secure way so that such information cannot be easily removed, altered or defaced by a thief. It would also be desirable if such information could be easily and reliably read by law enforcement personnel. It would also be desirable if the components of such a system were inexpensive to manufacture. Furthermore, it would be desirable if identification information could be applied to property in such a way that it may be accurately and reliably read or perceived without the necessity for equipment that may be subject to electromagnetic interference.

ADVANTAGES OF THE INVENTION

Accordingly, the invention described and claimed herein provides among its advantages a system for marking property with identification information in a secure manner so that such information cannot be easily removed, altered or defaced by a thief. Another advantage of the invention is that it provides a system for retrieving identification information easily and reliably and without the necessity for equipment that may be subject to electromagnetic interference. Still another advantage of the invention is that it may be employed to retrieve identification information from any item property having an interior space of relatively small size.

Additional advantages and features of this invention will become apparent from an examination of the drawings and the ensuing description.

EXPLANATION OF TECHNICAL TERMS

As used herein, identification information is information, such as a unique number, word, phrase, alphanumeric code, or other information that may be used to identify an item of personal property and to distinguish it from other items of similar property.

As used herein, an information retrieval device is a personal computer or similar device that is adapted and configured to contain information that may be retrieved upon demand.

As used herein, a semiconductor memory chip is a semiconductor chip capable of storing identification information, which chip is provided with a signal electrical pole and a ground electrical pole. The signal electrical pole is configured as an open drain output, so that the information stored by the chip can be accessed by contact with a conductive probe that is electrically connected to an open drain type bidirectional port of a personal computer or other information retrieval device.

SUMMARY OF THE INVENTION

The invention comprises a system for applying identification information to an item of property and for retrieving such information. The item of property must have an interior space in which a semiconductor memory chip may be mounted, and this space must be accessible to a reader probe. The system includes an identification module which contains a semiconductor memory chip containing identification information. The identification module also includes a component mount that is adapted to hold the memory chip in the interior space of the item of property. The system also includes a reader for retrieving the identification information from the semiconductor memory chip. The reader includes a signal lead and a ground lead that are adapted for connection to an information retrieval device. The reader also includes a probe that is adapted to make electrical contact between the signal electrical pole of the memory chip and the signal lead, and a conductor that is adapted to make electrical contact between the ground electrical pole of the memory chip and the ground lead, while the chip is mounted in the interior space of the item of property.

A method for identifying an item of property containing an interior space in which a semiconductor memory chip may be mounted is also described and claimed herein.

The invention thus permits the marking of property with identification information in a secure manner so that such information cannot be easily removed, altered or defaced by a thief. Furthermore, the invention provides a system for retrieving identification information from such property easily and reliably and without the necessity for equipment that may be subject to electromagnetic interference.

In order to facilitate an understanding of the invention, the preferred embodiments of the invention are illustrated in the drawings, and a detailed description thereof follows. It is not intended, however, that the invention be limited to the particular embodiments described or to use in connection with the items of property or other apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which:

FIG. 4 is a sectional view of a tubular component of an item of property showing the identification module of FIG. 1 and a reader that is adapted for use therewith as the probe of the reader makes contact with the identification module.

FIG. 5 is a view similar to that of FIG. 4, but showing an alternative means of contact between the reader and the identification module.

FIG. 7 is a sectional view of a tubular component of an item of property showing an alternative embodiment of the identification module of the invention, along with a reader that may be used therewith.

FIG. 8 is a view similar to that of FIG. 7, but showing the probe of the reader of the alternative embodiment in contact with the identification module.

DESCRIPTION OF THE PREFERRED EMBODIMENTS OF THE INVENTION

The invention may be used to apply identification information to, and to retrieve such information from, any item of property that is provided with an interior space in which a semiconductor memory chip may be mounted. The invention may be used in connection with items of property that are electrically conductive (or that include electrically conductive components), or in connection with items or property that are not electrically conductive. The preferred embodiments of the invention may be used in connection with items of property having a frame comprised at least in part of an electrically conductive tubular component, such as, for example, unicycles, bicycles, motorcycles, tricycles, four-wheelers and ATVs.

When attached to an object or carried by a person, semiconductor memory chips may be used to identify and carry relevant information that may be instantly available with little or no human intervention. Semiconductor memory chips are generally designed to read or write with a momentary contact, and consequently, they may be used to allow access to secure areas by accessing locks and other security arrangements, or they may allow workers to efficiently track items as they move through a manufacturing process. Semiconductor memory chips such as are manufactured by Dallas Semiconductor Corporation of Dallas, Texas may be advantageously used in connection with the invention. Such chips are housed in a stainless steel or other conductive enclosure that is generally in the shape of a coin. This enclosure is referred to by its manufacturer as a "MicroCan". The MicroCan serves both as protective housing and electrical contacts for the chip contained inside. The Model DS 1990A memory chip, which is preferred for use in connection with the invention, is known as the "Touch Serial Number" by Dallas Semiconductor. Each such chip contains a unique serial number that represents a permanent registration code that is stored in laser-cut polysilicon links. Consequently, the DS1990A needs no energy to retain data. Furthermore, almost no energy is required for operation. The DS1990A uses the voltage of the data line ("parasitic power") and stores a minimum of charge internally to maintain operation during a read operation.

Semiconductor memory chips do not rely on radio frequencies for communication, since data is transferred by electrical conductivity during momentary contact with a suitable probe. Furthermore, semiconductor memory chips that are housed in a protective conductive enclosure are shielded against the influence of electromagnetic fields. Such memory chips are designed for poor, intermittent contacts and are able to withstand large mechanical stresses. They need only two electrical contacts, which are insensitive to angular orientation.

Figure 1:
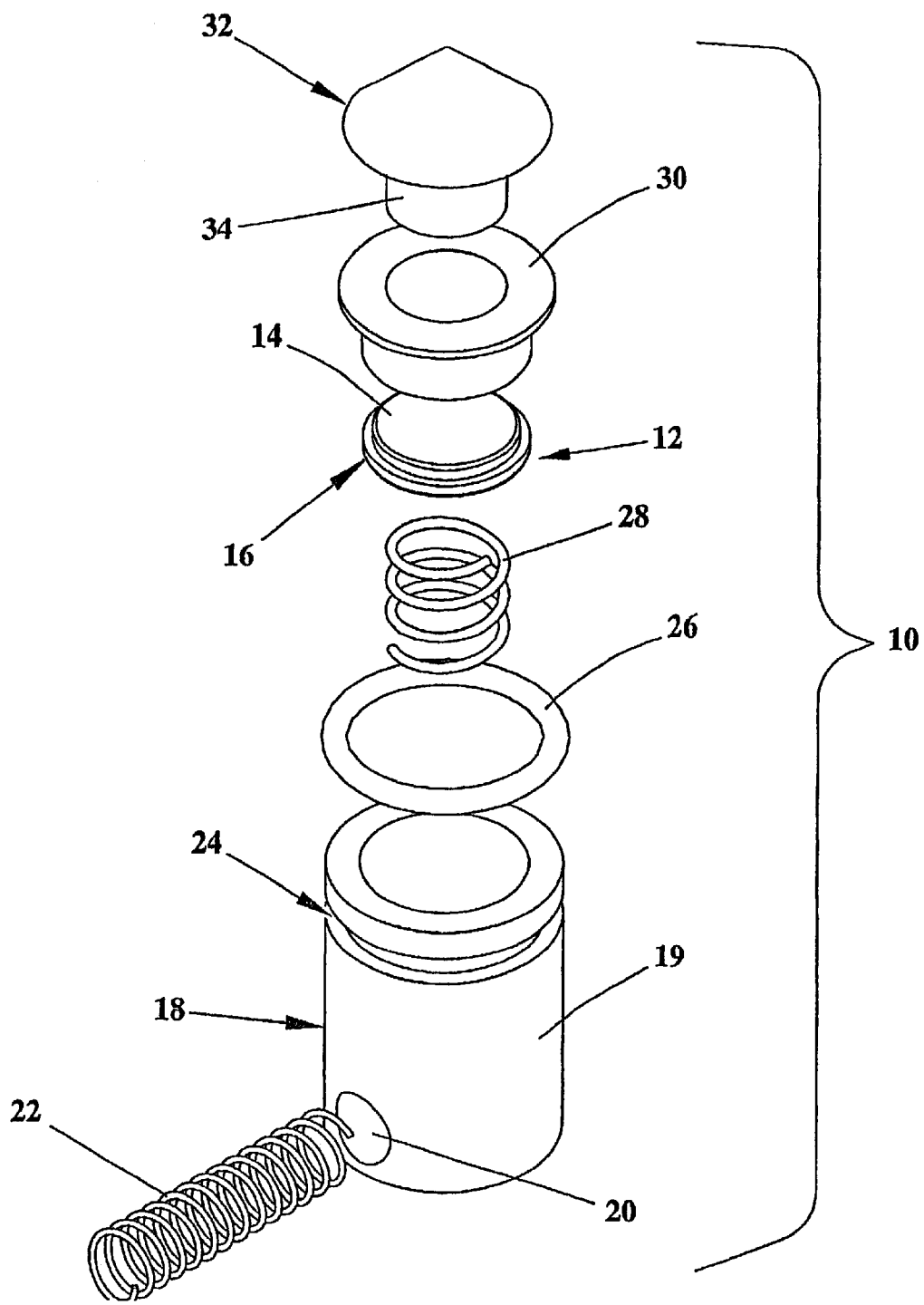
FIG. 1 is an exploded view of a preferred identification module that may be used in connection with the invention.

Referring now to FIG. 1, identification module 10 is comprised of a semiconductor memory chip, such as the DS 1990A (not shown), housed in a MicroCan, that is contained in a component mount (as subsequently described). As used hereinafter in this application, the MicroCan or housing 12, containing a semiconductor memory chip, may also be referred to as the semiconductor memory chip, because the housing is operatively electrically connected to the chip. Thus, upper surface 14 of housing 12 is electrically connected to the signal electrical pole or data line (positive pole) of the chip, and base 16 is electrically connected to the ground electrical pole (negative pole) of the chip. The preferred DS 1990A chip is housed in a MicroCan that is 16.3 mm in diameter.

Identification module 10 is designed to be secured inside a tubular component such as the seat tube of a bicycle or motorcycle. It could also be mounted in an interior space of any of a number of other items of property. Identification module 10 is designed primarily for use by the owner of an item of personal property that was manufactured without an integral identification module. Identification module 10 includes a component mount that is adapted to hold the memory chip in the interior space of a tubular component. The component mount includes module body 18, is generally cylindrical, having a base (not shown) and a depending sidewall 19, which are preferably made of aluminum. Of course, if the module is designed for placement in a nontubular space, the component mount may be provided in any other convenient shape, so long as it is designed to securely hold the memory chip within the item of property. Sidewall 19 of module body 18 is provided with a hole 20 extending therethrough to accommodate a retainer spring 22, which acts to hold the module securely in place within the seat tube and to center the module within the tube (see FIGS. 4 and 5). If the tube is electrically conductive, the spring will also provide electrical connection between module body 18 and the tube. Preferably, spring 22 is about one quarter inch longer than the internal diameter of the tubular component in which it is installed.

Figure 6:
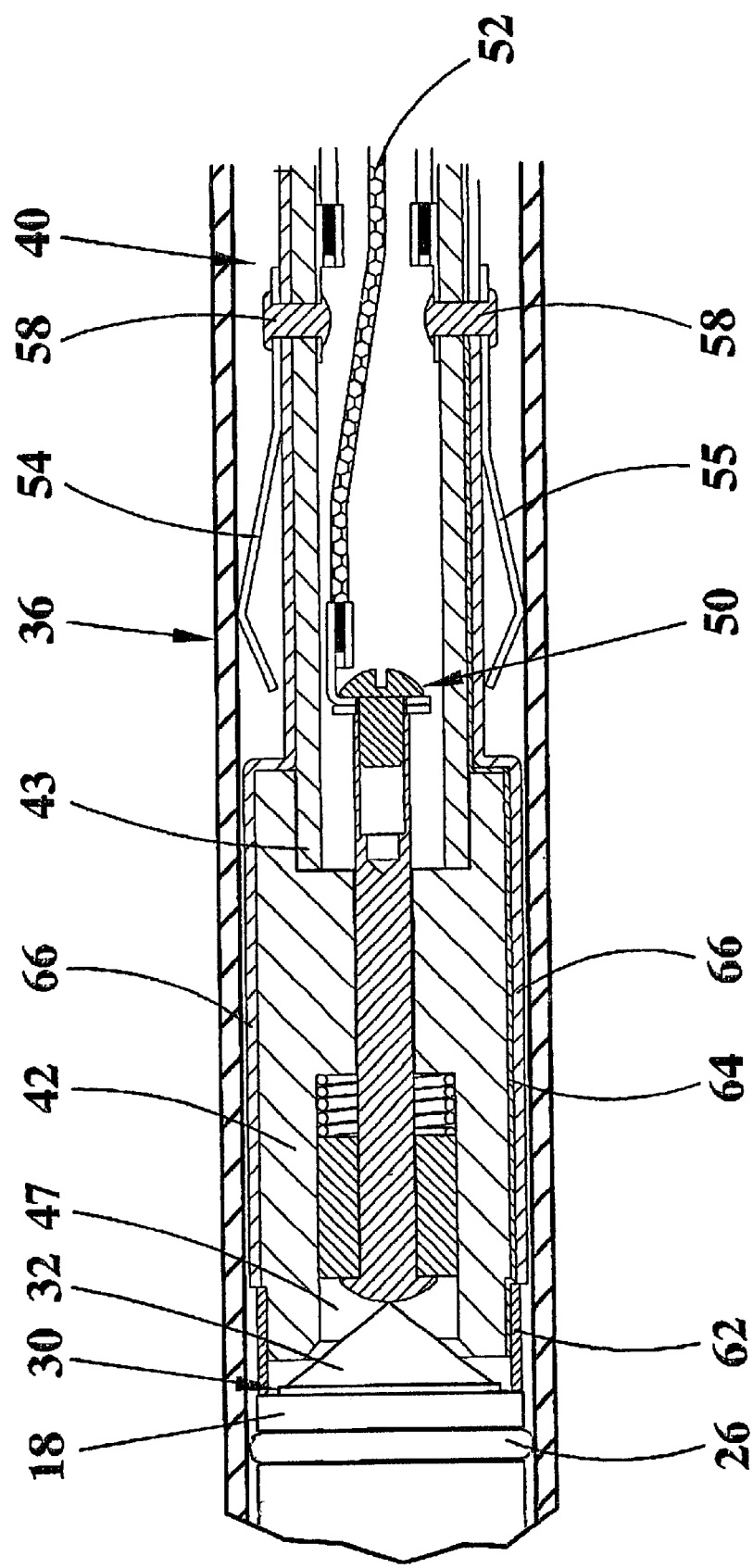
FIG. 6 is an enlarged view of a portion of FIG. 5, showing the alternative means of electrical contact between the reader and the identification module.

An annular groove 24 in the module body is designed to accommodate a vibration-dampening gasket such as O-ring 26. A seating spring 28 is placed inside the body 18 and memory chip 12 is placed atop the seating spring. The seating spring provides shock absorption for the chip as well as continuous positive contact between the ground electrical pole (the base) of the chip and the module body 18. An insulating bushing 30 is then placed over the top of the module body. The bushing is shaped so as to electrically insulate end cap 32 from the module body; however, the bushing does not completely cover the end of module body 18, as best shown in FIGS. 4 through 6. End cap 32 has an appendage or stem 34 that extends downwardly into the module body so as to contact the signal electrical pole of the chip.

Figure 2:
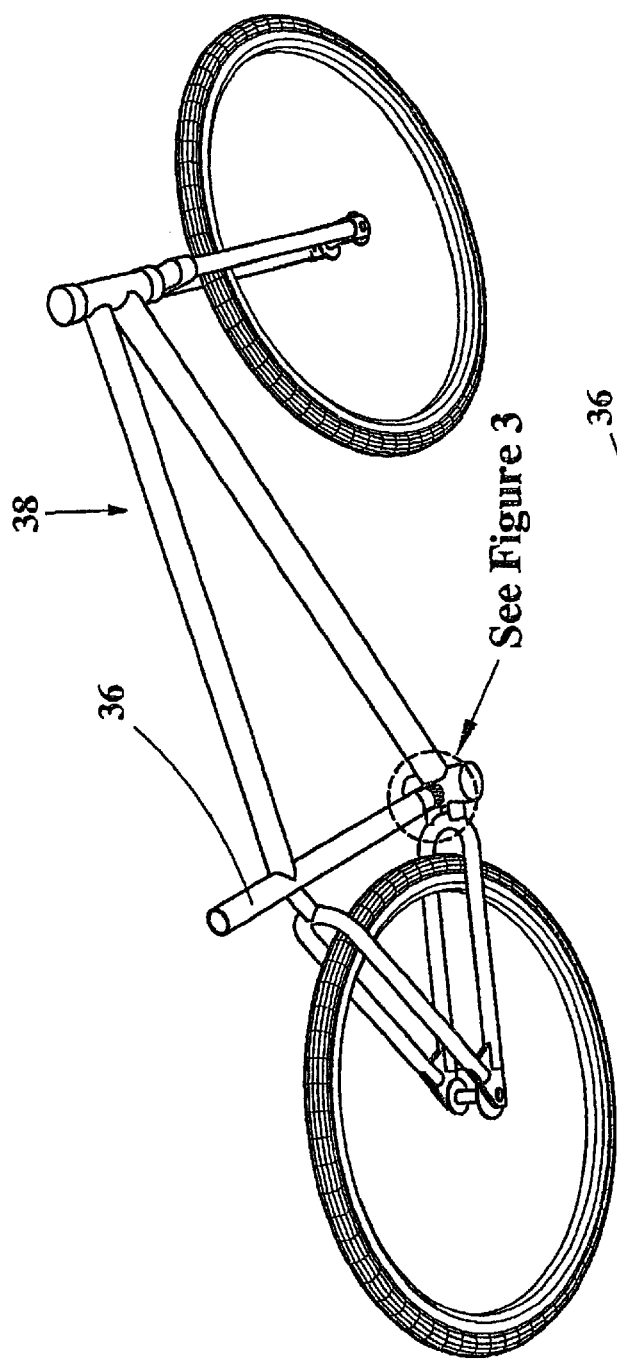
FIG. 2 is a perspective view of a portion of a bicycle, illustrating the preferred placement of the identification module of FIG. 1 in a partial cut-away view of a portion of the tubular frame component thereof.
Figure 3:
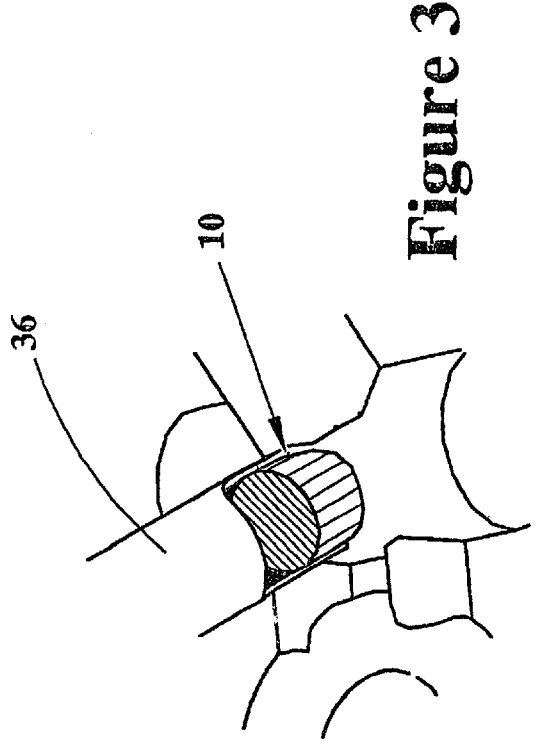
FIG. 3 is an enlarged view of a portion of FIG. 2 showing the preferred placement of the identification module.

As shown in FIGS. 2 through 6, module 10 may be placed in a tubular component 36 of an item of property such as bicycle 38. The module should be pushed far enough into the tube to make removal difficult. The module may be installed in the seat tube of a bike by removing the seat and attached seat post and compressing the retainer spring to allow the module to fit within the tube. The module is then pushed into the tube. Preferably, as shown in FIGS. 2 and 3, the module will be pushed all the way to the bottom of the seat tube unless it first encounters an obstruction in the tube such as a bottle mounting screw.

A reader is employed to make electrical contact with the memory chip to retrieve the unique serial number (or other identification information) encoded therein. Depending on whether the identification module is placed in an electrically conductive or in a non-conductive component of an item of property, the embodiment of the reader illustrated in FIGS. 4 through 6 will employ one of two different means for making electrical contact with the memory chip.

As illustrated in FIGS. 4 through 6, reader 40 includes a non-conductive body, of plastic or other suitable material, comprised of front body portion 42 and rear body portion 43. A metal rod-shaped probe 44 is fixed to a non-conductive bushing 46, which is disposed in a central cavity 47 (see FIGS. 5 and 6) in front portion 42. A coil spring 48, located just to the rear of the non-conductive bushing, urges the bushing, carrying probe 44, forward (to the left in FIGS. 4 through 6). One end 50 of probe 44 is electrically connected to signal (or positive) lead 52 of the reader. A first conductor that is adapted to make electrical contact between the ground pole of the memory chip and the ground lead is comprised of electrically-conductive strips 54 and 55, which are attached to rear body portion 43, and to ground (or negative) leads 56 and 57 by means of rivet connections 58 and 59, respectively.

FIG. 4 illustrates the operation of the reader in connection with an identification module that is mounted in an electrically-conductive tube. When the reader is placed into the seat tube, contact strips 54 and 55, of metal or other conductive material, will make electrical contact with the inside surface of the seat tube, providing a ground (or negative) pole for the circuit between the reader and the chip through the seat tube, spring 22, body 18 and spring 28 (see FIG. 1). At the same time, spring 48 pushes end cap contact end 60 of probe 44, which is attached to the signal (or positive) lead 52, into contact with end cap 32 of the identification module, thereby providing a signal (or positive) pole for the circuit between the reader and the chip.

FIGS. 5 and 6 illustrate the operation of the reader in connection with an identification module that is mounted in a non-conductive tube. This alternative mechanism may also be used if the tube is conductive, but good electrical contact cannot be made because of the presence of paint or other material between strips 54 and 55 and the tube. As shown in FIGS. 5 and 6, the probe may be pushed further into the tube so that a second conductor may be employed to make electrical contact between the ground pole of the memory chip and the ground lead. This conductor is contact ring 62, comprised of metal or other conductive material. Ring 62 has a diameter slightly larger than that of end cap 32 so as to make electrical contact with module body 18 outside of insulating bushing 30 (best shown in FIG. 6). A metallic tape strip 64 is applied to the outer surface of body portions 42 and 43, beginning beneath ring 62 and continuing to rivet connection 59, which is connected to negative lead 57. A similar metallic tape strip may also be applied to the outer surface of body portions 42 and 43 to electrically connect the ring to rivet connection 58, although such connection is not shown in the drawings. This contact between ring 62 and module body 18 will provide a ground (or negative) pole for the circuit between the reader and the chip through body 18 and spring 28.

A protective shrink tubing 66 (best shown in FIG. 6) extends from just behind ring 62 on module body portion 42 to the end (not shown) of module body portion 43 to protect the reader from being damaged as it is inserted into and removed from the tube.

Positive lead 52 and negative leads 56 and 57 of reader 40 are preferably attached to a standard RJ-11 plug at the end of the reader cable (not shown). The RJ-11 plug may then be plugged into a COM Port adapter such as the DS9097 adapter that is manufactured by Dallas Semiconductor Corporation, and the COM Port adapter may be attached to the COM 1 serial port of a personal computer. Power to read the chip is "stolen" through the COM Port adapter.

Preferably, the reader will be provided in a length of at least two feet, in order to provide access to identification modules that may be placed into long tubes. Of course, it may be provided in any convenient length, although if the reader and reader cable are longer than about fifty feet, a signal booster may be necessary to overcome the resistance in such a lengthy conductor.

The computer or other information retrieval device to which the reader is attached may be programmed with owner-provided information about a number of items of personal property. Such information may include the owner identity, address and telephone number, for example. It could also include information about the item of personal property such as the identity of the manufacturer. Each item of property included in the database would be linked in the database with the unique identification information in the semiconductor memory chip associated therewith. Readers for use in connection with the invention could be provided to law enforcement personnel, so that items of stolen property that may be recovered could be checked to determine if they are registered in the database associated with the invention.

Upon recovery of a bicycle, for example, law enforcement personnel could attach the reader to a desktop or laptop computer by attaching the DS9097 adapter to the COM1 serial port and plugging the RJ-11 plug attached to the reader cable into the DS9097 (or other compatible) adapter. The investigator could then access the database, which would place the computer in a sensing mode, awaiting data from the DS9097 adapter. The investigator could then remove the seat and attached seat post from the bicycle and insert the reader into the seat tube until contact was established with the identification module. This would complete a circuit allowing the unique identification information carried by the DS 1990A memory chip to be read by the DS9097, which would then pass it to the serial port. If no identification module were present, there would be no response. Visual inspection of the interior of the tube with a flashlight could verify the absence of a module. A database software package has been developed by Advanced Technology Integration, LLC of Signal Mountain, Tenn. (utilizing the software development kit provided by Dallas Semiconductor Corporation) to interpret the unique identification information of the chip and match it with information provided by the owner of the item of property, so that the owner can be contacted to retrieve his property. Other similar database software packages could be developed by those having ordinary skill in the art to which the invention relates. It is contemplated that the database of owner-provided information could be accessed through a modem or by secure access to an interactive internet site, so that readers attached to computers owned by law enforcement agencies around the world could obtain access to the information.

FIGS. 7 and 8 illustrate a type of identification module that may be integrated into the manufacturing process of an item of personal property. This identification module may be utilized in connection with items of property that are electrically conductive (or that include electrically conductive components), or in connection with items or property that are not electrically conductive. As shown in the drawings, component mount 110 is comprised of a generally circular conductive ring 118 having a conductive retaining clip 120 at one end. The ring and clip are configured to hold a chip 12 at a particular location relative to an access hole 70 that is provided through the side of the tube or other conductive or non-conductive component of the property. Hole 70 provides access for a reader to the chip (as will be subsequently explained) without requiring access through the end of the tube. Such reader may thus be employed to retrieve identification information from a semiconductor memory chip that is mounted in the seat tube of a bicycle without requiring removal of the seat and attached seat tube.

Preferably, ring 118 is a metal strip approximately one inch wide that is bent into a spiral shape having a diameter approximately one quarter inch larger than the inside diameter of the tube. It is compressed for placement into the tube and may be welded into place. The ring and clip provide electrical contact between the ground pole 16 of the chip and conductive sleeve 72, which extends through access hole 70 in the tube. If the tubular component is electrically conductive and if good electrical contact is made between the ring and the tubular component, the ground pole of the chip will also be in electrical contact with the tubular component. Sleeve 72 also serves to hold the ring in place in the tube and to provide access to the chip for the reader. The reader 140 includes a central rod-shaped probe 160 and a non-conductive bushing 146. The bushing prevents electrical contact between the (positive) probe of the reader and the ground (negative) pole of the chip through the tube, ring and clip. The probe of the reader may be inserted though the sleeve so as to contact the signal electrical pole 14 of the chip, as shown in FIG. 8. The ground or negative contact between the reader and the chip is made by contact of conductor 162 of the reader with the ground pole 16 of chip 12 through conductive sleeve 72, ring 118 and clip 120. The positive lead (not shown) of the reader is electrically attached to probe 160, and the negative lead (also not shown) is electrically attached to conductor 162. The positive and negative leads of the reader are preferably attached to a standard RJ-11 plug at the end of the reader cable (also not shown) in much the same manner as is employed with reader 40. The RJ-11 plug of reader 140 may then be plugged into a COM Port adapter such as the DS9097 adapter that is manufactured by Dallas Semiconductor Corporation, and the COM Port adapter may be attached to the COM1 serial port of a personal computer or other information retrieval device. Reader 140 is employed in much the same way as is reader 40 to retrieve identification information from chip 12, except that the chip is accessed through hole 70 in the side of the seat tube instead of through the top of the tube.

As can be seen from the description herein, the invention provides a system for marking property with identification information in a secure manner so that such information cannot be easily removed, altered or defaced by a thief. Furthermore, the invention provides a system for retrieving identification information easily and reliably and without the necessity for equipment that may be subject to electromagnetic interference. Finally, the invention may be employed to retrieve identification information from any item of property having an interior space of relatively small size.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A system for applying identification information to, and retrieving such information from, an item of property having a tubular frame defining an interior space in which a semiconductor memory chip may be mounted, which space is accessible to a reader probe, which system includes:

(a) an identification module which includes:
(i) a semiconductor memory chip containing identification information, which chip has a signal electrical pole and a ground electrical pole;
(ii) a component mount that is adapted to hold the memory chip in the tubular frame defining the interior space of the item of property;
(b) a reader for retrieving the identification information from the semiconductor memory chip while the memory chip is mounted in the component mount in the tubular frame defining the interior space of the item of property, which reader includes:
(i) a signal lead that is adapted for connection to an information retrieval device;
(ii) a ground lead that is adapted for connection to an information retrieval device;
(iii) a probe that is adapted to make electrical contact between the signal electrical pole of the memory chip and the signal lead while the chip is mounted in the tubular frame defining the interior space of the item of property;
(iv) a conductor that is adapted to make electrical contact between the ground pole of the memory chip and the ground lead while the chip is mounted in the tubular frame defining the interior space of the item of property.

2. The system of claim 1 which is adapted for application and retrieval of identification information from an item of property containing an electrically conductive tubular component having an interior space in which a semiconductor memory chip may be mounted, which system includes:

(a) a component mount that is adapted to hold the memory chip in the interior space of the electrically conductive tubular component in a manner such that the ground electrical pole of the memory chip is in electrical contact with the electrically conductive tubular component, while the signal electrical pole of the chip is not in electrical contact with the electrically conductive tubular component; and
(b) a reader which includes a conductor that is adapted to make electrical contact between the ground pole of the memory chip and the ground lead through the electrically conductive tubular component while the chip is mounted in the interior space of the electrically conductive tubular component.

3. The system of claim 1 wherein the reader includes an elongated non-conductive body portion having a central hole which is adapted to receive the probe, and the probe has an outer end cap contact end and an inner signal lead attachment end to which the signal lead is attached, and wherein a spring is provided to urge the end cap contact end of the probe outwardly of the body portion.

4. The system of claim 1 which is adapted for application and retrieval of identification information from an item of property having a frame comprised at least in part of a tubular component.

5. The system of claim 1 which is adapted for application and retrieval of identification information from an item of property that is selected from the group consisting of unicycles, bicycles, motorcycles, tricycles, four-wheelers and ATVs.

6. The system of claim 1 wherein the component mount comprises a generally circular conductive ring that is adapted for placement within a tubular frame component, said ring having a retaining clip at one end that is adapted to receive the semiconductor memory chip and to provide an electrical connection between the ground electrical pole of the chip and the ring, and wherein a hole is provided through the tubular frame component which hole is located so that the signal pole of the chip may be contacted by a probe of a reader that is inserted through the hole, and wherein an electrically conductive sleeve is provided that extends through the hole in the tubular frame component.

7. The system of claim 6 in which the reader includes a probe that is adapted to contact the signal electrical pole of the chip and a non-conductive bushing that is adapted to electrically insulate the probe from the conductive sleeve that extends through the hole in the tubular frame component.

8. The system of claim 1 wherein the component mount comprises:
 (a) a generally cylindrical module body that is adapted for placement within a tubular frame component, said module body having a base and a depending sidewall and being adapted to receive a semiconductor memory chip and to provide an electrical connection with the ground electrical pole of the chip;
 (b) an electrically conductive end cap that is adapted to fit on the module body and to provide an electrical connection with the signal electrical pole of the chip, said module body and cap being located within the frame component so that the cap may be contacted by the probe of the reader;
 (c) an insulating bushing that is adapted to electrically insulate the end cap from the module body.

9. The system of claim 8 wherein a seating spring is provided between the base of the module body and the memory chip.

10. The system of claim 8 wherein the sidewall of the module body is provided with an annular groove that is adapted to retain a vibration dampening gasket.

11. The system of claim 8 wherein the end cap is provided with a conical projection on its outer surface that is adapted to be contacted by the probe of the reader and an appendage on its inner surface that is adapted to contact the signal electrical pole of the memory chip.

12. The system of claim 8 wherein module body is electrically conductive and wherein the reader includes a conductor comprising a contact ring that is adapted to make electrical connection between the ground lead and the ground electrical pole of the chip through the sidewall of the module body.

13. The system of claim 8 which is adapted for application and retrieval of identification information from an item of property containing an electrically conductive component having an interior space in which a semiconductor memory chip may be mounted, wherein:
 (a) the module body is electrically conductive and is adapted to hold the memory chip in the interior space of the electrically conductive component in a manner such that the ground electrical pole of the memory chip is in electrical contact with the electrically conductive component, while the signal electrical pole of the chip is not in electrical contact with the electrically conductive component; and
 (b) the reader includes a conductor that is adapted to make electrical contact between the ground pole of the memory chip and the ground lead through the electrically conductive component while the chip is mounted in the interior space of the electrically conductive component.

14. The system of claim 13 wherein the conductor of the reader includes a contact strip that is adapted to make electrical contact between the ground lead and the tubular frame component.

15. The system of claim 13 wherein an electrically conductive retainer spring is provided to hold the module body securely within the tubular frame component and to make electrical contact between the sidewall of the module body and the tubular frame component.

16. A method for identifying an item of property having a tubular frame defining an interior space in which a semiconductor memory chip may be mounted, which space is accessible to a reader probe, which method comprises:
 (a) providing an identification module which includes:
  (1) a semiconductor memory chip containing identification information, which chip has a signal electrical pole and a ground electrical pole;
  (2) a component mount that is adapted to hold the memory chip in the tubular frame defining the interior space of the item of property;
 (b) mounting the component mount with the memory chip attached thereto in the tubular frame defining the interior space of the item of property;
 (c) providing a reader for retrieving the identification information from the semiconductor memory chip while the memory chip is mounted in the component mount in the tubular frame defining the interior space of the item of property, which reader includes:
  (1) a signal lead that is adapted for connection to an information retrieval device;
  (2) a ground lead that is adapted for connection to an information retrieval device;
  (3) a probe that is adapted to make electrical contact between the signal electrical pole of the memory chip and the signal lead while the chip is mounted in the tubular frame defining the interior space of the item of property;
  (4) a conductor that is adapted to make electrical contact between the ground electrical pole and the ground lead while the chip is mounted in the tubular frame defining the interior space of the item of property;
 (d) attaching the probe to the signal lead to make electrical contact therewith;
 (e) attaching the conductor to the ground lead to make electrical contact therewith;
 (f) providing an information retrieval device that is adapted to retrieve information from the memory chip;
 (g) connecting the signal lead of the reader to the information retrieval device;
 (h) connecting the ground lead of the reader to the information retrieval device;
 (i) contacting the probe to the signal electrical pole of the memory chip;
 (j) contacting the conductor to the ground electrical pole of the memory chip;
 (k) actuating the information retrieval device to retrieve the information from the memory chip.

* * * * *